United States Patent
Reasoner

(10) Patent No.: US 6,269,411 B1
(45) Date of Patent: Jul. 31, 2001

(54) SYSTEM FOR ENABLING STACKING OF AUTOCHANGER MODULES

(75) Inventor: Kelly J. Reasoner, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/372,821

(22) Filed: Aug. 12, 1999

(51) Int. Cl.[7] .................................................. G06F 3/00
(52) U.S. Cl. .................................. 710/9; 369/30; 369/34
(58) Field of Search ................................... 710/9; 369/30, 369/34, 32, 33, 48, 54

(56) References Cited

U.S. PATENT DOCUMENTS

| | | | |
|---|---|---|---|
| 5,025,431 | * | 6/1991 | Naito . |
| 5,233,591 | * | 8/1993 | Nishihara ................................ 369/54 |
| 5,266,781 | * | 11/1993 | Warwick et al. ..................... 235/375 |
| 5,596,556 | | 1/1997 | Luffel et al. ............................ 369/36 |
| 5,883,864 | * | 3/1999 | Saliba .................................... 369/30 |
| 6,038,200 | * | 3/2000 | Ozue et al. ............................ 369/34 |

OTHER PUBLICATIONS

U.S. Ser. No. 09/137,350, White et al., filed Aug. 20, 1998, for "Modular Data Storage System".
U.S. Ser. No. 09/045,134, Schmidtke et al., filed Mar. 20, 1998, for "Multi–Plande Translating Cartridge Handling System".

* cited by examiner

Primary Examiner—Ario Etienne

(57) ABSTRACT

A modular autochanger system comprises a plurality of autochanger modules which are physically connected. An electrical bus is connected to each of the plurality of autochanger modules for sending commands and receiving status information from the plurality of autochanger modules. An automatic addressing circuit is connected to each of the plurality of autochanger modules for automatically providing a unique bus address to each of the plurality of autochanger modules.

23 Claims, 6 Drawing Sheets

SYSTEM FOR ENABLING STACKING OF AUTOCHANGER MODULES

FIELD OF THE INVENTION

This invention relates generally to autochanging data storage systems for handling and storing data cartridges, such as optical disk or magnetic tape cartridges, and more specifically to a system to enable stacking of multiple autochanger modules.

BACKGROUND OF THE INVENTION

Many different types of data storage systems exist and are used to store data cartridges at known locations and to retrieve desired data cartridges so that data may be written to or read from the data cartridges. Such data storage systems are often referred to as autochangers, or "juke box" data storage systems, particularly if they can accommodate a large number of individual data cartridges. The autochanger receives commands from an external source such as a computer system, and in response to those commands can automatically change data cartridges in a cartridge reader. This provides access to multiple data cartridges without the need to manually place them in a cartridge reader.

A typical autochanger system may include one or more different types of cartridge receiving devices for holding the various data cartridges. For example, one type of cartridge receiving device may comprise a cartridge storage rack or "magazine" while another type of cartridge receiving device may comprise a cartridge read/write device. The cartridge storage racks or magazines serve to provide storage locations for the data cartridges and are often arranged so that they form one or more rows, although other configurations are possible. The cartridge read/write device may be located at any convenient location within the data storage system.

The autochanger may also be provided with a moveable cartridge picker assembly or "picker" for transporting the data cartridges between the various cartridge receiving devices, e.g., between the cartridge storage racks and the cartridge read/write devices. A typical cartridge picker assembly or picker may also be provided with a cartridge plunge mechanism or "thumb" assembly for engaging the various data cartridges contained in the cartridge receiving devices and for drawing them into the picker. A picker positioning system associated with the cartridge picker assembly may be used to move the cartridge picker assembly along the various cartridge receiving devices.

Autochangers of the type described above are usually connected to a host computer system which may be used to access or store data on the data cartridges. For example, if the host computer system issues a request for data contained on a particular data cartridge, a control system associated with the data storage system will actuate the picker positioning system to move the picker assembly along the cartridge storage racks until the picker assembly is positioned adjacent the desired data cartridge. The cartridge plunge mechanism or "thumb" assembly associated with the picker assembly may then remove the data cartridge from the cartridge storage rack and draw it into the picker assembly. The picker positioning system may then be actuated to move the picker assembly to the appropriate cartridge read/write device. Once properly positioned adjacent the cartridge read/write device, the thumb assembly may insert the selected data cartridge into the cartridge read/write device so that the host computer may thereafter read data from or write data to the data cartridge. After the read/write operation is complete, the thumb assembly may be actuated to remove the data cartridge from the cartridge read/write device. The picker assembly may thereafter return the data cartridge to the appropriate location in the cartridge storage rack.

It may be advantageous to connect multiple autochanger modules in order to increase the total storage capacity of the system. In one system, multiple autochanger modules have been interconnected in a vertical stack. A single picker assembly is provided for the multiple autochanger modules, and the autochanger modules are configured so that the picker assembly may be moved vertically between the autochangers as well as horizontally inside a single autochanger. The picker assembly may thus access a data cartridge from any autochanger and place it in any cartridge read/write device in the stack of autochanger modules. The total storage capacity of the system is thereby increased, as well as the number of cartridge read/write devices which may be simultaneously accessed. There are several advantages of creating an autochanger stack over simply connecting multiple individual autochangers to a network. First, the cost of an autochanger stack is less than the equivalent number of individual autochangers, since only one picker assembly is needed, and individual housings are not needed. Furthermore, the computer system only needs to address one device with a stacked autochanger, rather than multiple devices. This allows all cartridge read/write devices in the autochanger stack to access any data cartridge from any level in the stack.

However, currently known vertical stacking systems for autochangers are not without their problems. A large number of electrical connectors are required between the autochanger modules in the autochanger stack. Aside from the data and address bus cables which must be connected to each cartridge read/write device in each autochanger, many control cables must be connected to each autochanger. For example, in an autochanger stack with eight autochangers, each autochanger may have two drawers for inserting magazines or read/write devices. Three sensors are connected at each level to determine the position of the drawers, requiring 24 cables between the eight autochanger modules in the stack. Additional cables may be required to eject or load a data cartridge, to read the status of an autochanger after an operation, or to control indicator lights on the front panels of the autochangers. The many control functions in the stacked autochangers therefore require a large number of electrical connectors, increasing the cost of the stacked autochanger system and complicating assembly and maintenance. Large and bulky ribbon cables also require a large amount of space, increasing the size of the stacked autochanger system. This adds to the complexity of the autochanger stack, making it difficult to connect each cable to the appropriate autochanger module in the stack.

Consequently, a need exists for an improved system for stacking autochangers. In particular, a need exists for a system enabling stacking of autochanger modules with a reduced amount of cabling between modules.

SUMMARY

To assist in achieving the aforementioned need, the inventor has devised a system to enable stacking of autochanger modules without manually configuring each autochanger module in the stack. The inventor has also devised a system of providing a bus and an automatic bus addressing circuit to reduce the amount of cabling required in the autochanger stack.

The invention may comprise a modular autochanger system having a plurality of autochanger modules which are physically connected. An electrical bus is connected to each of the plurality of autochanger modules for sending commands and receiving status information from the plurality of autochanger modules. An automatic addressing circuit is connected to each of the plurality of autochanger modules for automatically providing a unique bus address to each of the plurality of autochanger modules.

The invention may also comprise an autochanger stack having a plurality of autochanger modules being electrically connected by a bus for conveying command and status information between the plurality of autochanger modules. The autochanger stack also comprises a means for supplying a unique bus address to each of the plurality of autochanger modules in the autochanger stack.

The invention may also comprise a method of automatically creating a unique bus address in an autochanger in an autochanger stack. The method comprises determining whether a unique bus address was supplied by a previous autochanger in the autochanger stack. If the unique bus address was not supplied, the unique bus address is set to a default value. The unique bus address is passed to at least one device in the autochanger. A next unique bus address is created from the unique bus address. The next unique bus address is passed to a next autochanger in the autochanger stack.

BRIEF DESCRIPTION OF THE DRAWING

Illustrative and presently preferred embodiments of the invention are shown in the drawing, in which.

DESCRIPTION OF THE PREFERRED EMBODIMENT

Figure 1:
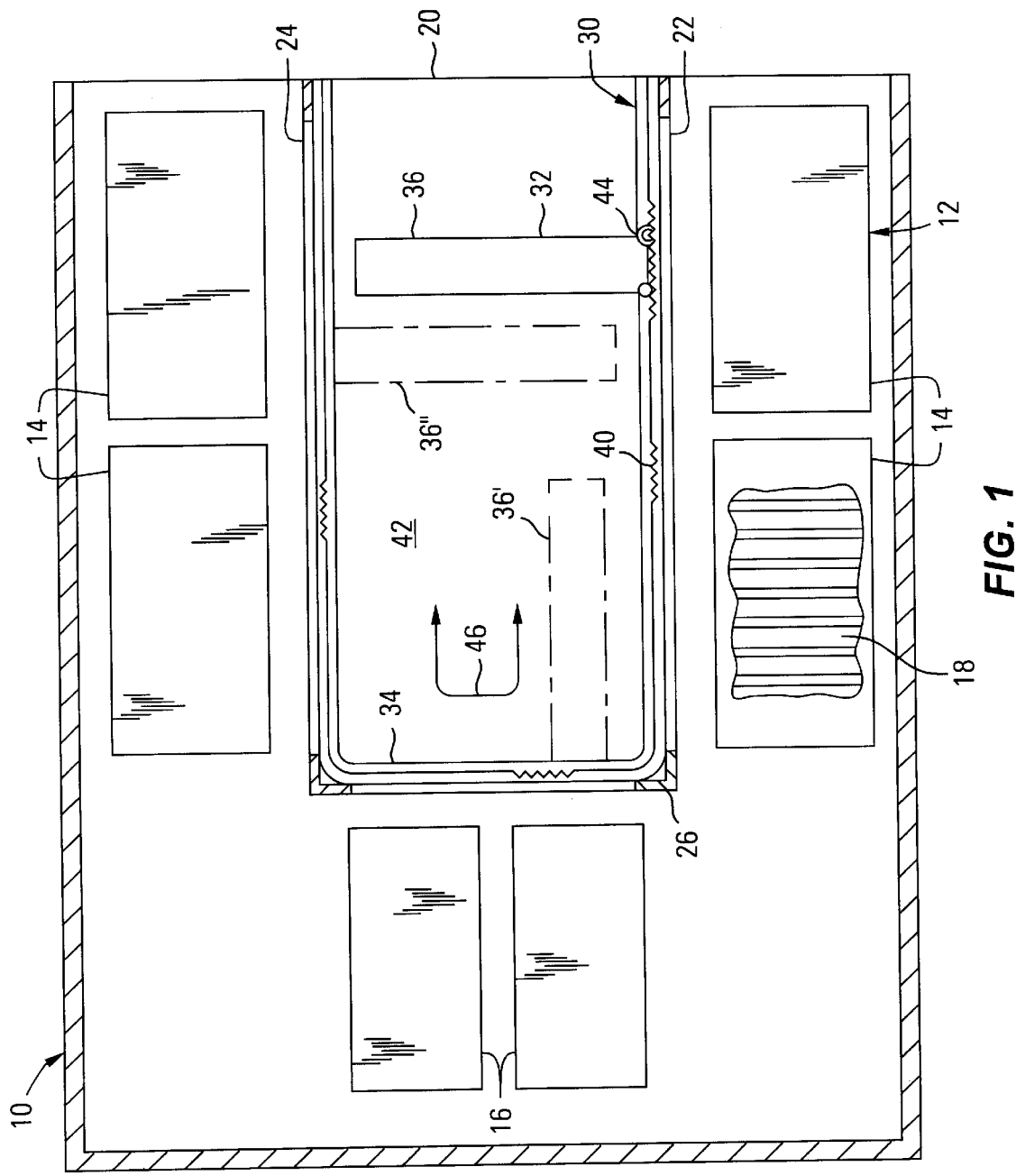
FIG. 1 is a plan view of an autochanger module with a cartridge picker assembly as it may be used to access and transport data cartridges contained within the autochanger module.

The drawing and description, in general, disclose a modular autochanger system 50 having a plurality of autochanger modules 52, 54, 56, 60, 62, 64, 66, and 70 which are physically connected. An electrical bus 76 is connected to each of the plurality of autochanger modules 52–70 for sending commands and receiving status information from the plurality of autochanger modules 52–70. An automatic addressing circuit 112 is connected to each of the plurality of autochanger modules 52–70 for automatically providing a unique bus address to each of the plurality of autochanger modules 52–70.

The drawing and description also disclose an autochanger stack 50 having a plurality of autochanger modules 52–70 being electrically connected by a bus 76 for conveying command and status information between the plurality of autochanger modules 52–70. The autochanger stack 50 also comprises a means 112 for supplying a unique bus address to each of the plurality of autochanger modules 52–70 in the autochanger stack 50.

The drawing and description also disclose a method of automatically creating a unique bus address in an autochanger in an autochanger stack. The method comprises determining 600 whether a unique bus address was supplied by a previous autochanger in the autochanger stack. If the unique bus address was not supplied, the unique bus address is set 602 to a default value. The unique bus address is passed 604 to at least one device in the autochanger. A next unique bus address is created 606 from the unique bus address. The next unique bus address is passed 608 to a next autochanger in the autochanger stack.

An autochanger 10 in an autochanger stack which benefits from a bus 76 and an autoaddressing circuit 112 is shown in FIG. 1. The autochanger 10 transfers data cartridges 12 between one or more cartridge receiving devices, such as one or more cartridge storage racks or magazines 14 with slots 18 for data cartridges 12, and one or more cartridge read/write devices 16. In one preferred embodiment, the autochanger 10 may comprise a data storage system of the type shown and described in U.S. patent application Ser. No. 09/045,134, filed Mar. 20, 1998, entitled "Multi-Plane Translating Cartridge Handling System," or in U.S. Pat. No. 5,596,556, entitled "Linear Displacement and Support Apparatus for use in a Cartridge Handling System," which are both incorporated herein by reference for all that they disclose.

The autochanger 10 comprises a generally rectangularly shaped frame or chassis assembly 20 having a pair of opposed side portions 22 and 24 and an end portion 26 around which are positioned various cartridge receiving devices. More specifically, a pair of cartridge storage racks or magazines 14 may be positioned adjacent each opposed side portion 22 and 24 of the frame or chassis assembly 20, whereas a pair of cartridge read/write devices 16 may be positioned adjacent the end portion 26 of the frame assembly 20. Accordingly, the various cartridge receiving devices (e.g., the cartridge storage racks or magazines 14 and the cartridge read/write devices 16) define a generally U-shaped configuration.

A picker positioning system 30 may be used to move a cartridge picker assembly 32 along a U-shaped guide track 34. For example, in the embodiment shown and described herein, the picker positioning system 30 may move the cartridge picker assembly 32 between a first position 36 adjacent the first side portion 22 of the frame assembly 20, a second position 36' adjacent the end portion 26 of frame assembly 20, and a third position 36" adjacent the second side portion 24 of frame assembly 20.

The picker positioning system 30 may comprise a rack and pinion drive system having a U-shaped gear rack 40 mounted to the lower plate 42 of frame assembly 20 at a position adjacent the U-shaped guide track 34. The cartridge picker assembly 32 may be provided with a pinion gear 44 sized and positioned so that it will engage the U-shaped gear rack 40 provided on the lower plate 42, thereby allowing the cartridge picker assembly 32 to be moved along the U-shaped path 46.

The cartridge picker assembly 32 has an interior chamber or cavity of sufficient size to receive a data cartridge 12, along with an apparatus for retrieving data cartridges 12 from and placing cartridges 12 in cartridge receiving devices 14 and 16. Thus, a data cartridge 12 may be moved from one cartridge receiving device such as a magazine 14 to another cartridge receiving device such as a read/write device 16. To do this, the cartridge picker assembly 32 is moved along the U-shaped path 46 by the pinion gear 44 and gear rack 40 until it is adjacent a data cartridge 12 in the magazine 14. The apparatus for retrieving data cartridges 12 then engages the data cartridge 12 and retracts it into the interior chamber of the cartridge picker assembly 32. The cartridge picker assembly 32 is then moved along the U-shaped path 46 until it is adjacent an empty cartridge read/write device 16, and the data cartridge 12 is extended into the read/write device 16.

To increase the storage capacity of an autochanger system, individual autochangers may be modified to provide stackable autochanger modules, such as described in U.S. patent application Ser. No. 09/137,350, filed Aug. 20, 1998, which is hereby incorporated by reference for all that is contained therein. In an autochanger stack a single cartridge picker assembly 32 may be shared between the autochanger modules. Generally, a stackable autochanger module is identical to an individual autochanger, except that the bottom plate (e.g., 42) is removed and a vertical picker positioning system is added to move the cartridge picker assembly 32 vertically between autochanger modules. Note that the term modular autochanger may refer to either end-user expandable systems or to manufactured systems based on multiple autochanger modules.

Figure 2:
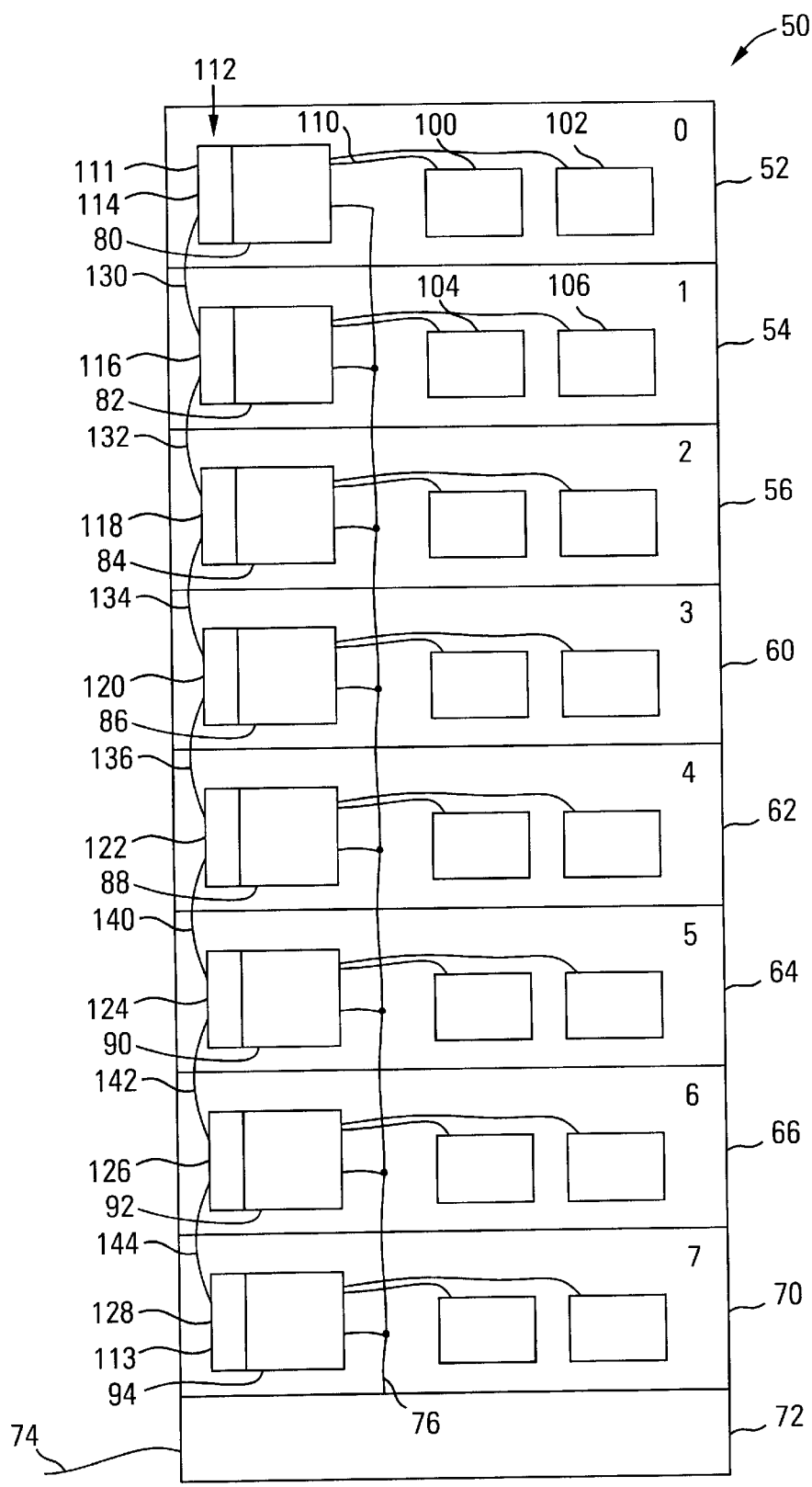
FIG. 2 is an elevation view of a stack of eight autochanger modules with a serial bus accessing a controller card in each of the autochanger modules, and an autoaddressing circuit providing a unique bus address to each controller card.

Referring now to FIG. 2, an exemplary autochanger stack 50 comprises eight autochanger modules 52, 54, 56, 60, 62, 64, 66, and 70, and a stack controller 72 which may be located either in a rack for the autochanger stack 50 or in one of the eight autochanger modules 52–70. The stack controller 72 is connected to an external computer or network by a cable 74 or other method, and receives data requests and commands for the autochanger stack. The stack controller 72 then sends commands to the appropriate autochanger module. This eliminates the need for the external computer to communicate directly with each individual autochanger module, simplifying operation. The stack controller 72 coordinates data requests and addresses them to the correct autochanger module 52–70 in the stack 50 so that the autochanger stack 50 appears as a single integrated unit to external computer systems.

In order to reduce the amount of cabling between the autochanger modules 52–70 and the stack controller 72, a bus 76 may be connected to the modules 52–70 and the stack controller 72 to transmit commands or receive status information. In the preferred embodiment, the bus 76 comprises a serial bus such as the "Inter IC" or "I²C" bus specified by Philips Semiconductors of the Netherlands. Alternatively, the bus 76 may comprise any serial or parallel bus now known or which may be developed in the future.

The I²C bus 76 is a bidirectional serial bus requiring two electrical conductors, one for data and one for a clock signal. The bus 76 is connected to devices or integrated circuits which incorporate circuitry for communicating on the bus 76. Each device on the bus is software addressable by a unique address, typically an eight-bit address consisting of seven address bits and a read/write (R/W̄) bit. The term "bit" as used herein refers to a single unit of information (derived from Binary+digIT) or to a single wire or signal for transmitting information.

Bus-controlled devices can be used to control the front panel of the autochanger stack, or to retrieve information from sensors that indicate if drawers are open or if a data cartridge is properly seated. Available I²C devices include microcontrollers, memories, input/output (I/O) ports, display drivers and data converters. The unique bus address is supplied to address input pins on each I²C device so that when commands are received over the bus 76, the device can compare the address sent with the command to its unique bus address as configured at its address input pins. If the address sent with the command corresponds to the device's unique bus address, the device responds to the command, otherwise, the device ignores the command.

The autochanger stack 50 illustrated in FIG. 2 has a bus 76 accessing a controller board 80, 82, 84, 86, 88, 90, 92, and 94 in each autochanger 52–70. When a controller board 80–94 receives a command addressed to it, it controls other devices (e.g., 100 and 102) in its autochanger 52–70 according to the command. For example, autochanger module 52 includes two cartridge read/write devices 100 and 102, autochanger module 54 includes two cartridge read/write devices 104 and 106, etc, so that each autochanger module 52–70 includes two cartridge read/write devices. To cause a particular cartridge read/write device 100 to read a data cartridge 12, the stack controller 72 transmits a read command over the bus 76 to the controller board 80 which compares the address sent with the command to the unique bus address for the autochanger module 52. If the addresses match, the controller board 80 sends the command to the cartridge read/write device 100 on internal cabling 110 in the autochanger 52. Other bus controlled devices in the autochangers 52–70 include sensors to determine the status of various cartridge receiving devices, and display panels on the front of each autochanger 52–70. Alternatively, the bus may access each individual device without a controller board, as will be described in more detail hereinafter.

In a preferred embodiment, the three most significant bits of the seven bit bus address correspond to the autochanger number, with the remaining four bits corresponding to devices in the autochanger (e.g., 52), such as cartridge read/write devices (e.g., 100), front panel indicator lights, or status sensors. Three binary bits can be used to provide unique bus addresses for eight autochangers 52–70.

Each controller board 80–94 may be individually configured with a unique three-bit bus address for each autochanger, such as with DIP switches or jumpers on each controller board 80–94. However, this requires extra care during assembly and maintenance. Preferably, an automatic addressing circuit 112 is used to automatically provide a unique bus address for each autochanger module 52–70.

An automatic addressing circuit 112 includes a subcircuit 114, 116, 118, 120, 122, 124, 126, and 128 in each autochanger module 52–70, respectively. The subcircuits 114–128 are connected in series by a set of electrical connectors 130, 132, 134, 136, 138, 140, 142, and 144. The subcircuits 114–128 include arithmetic circuitry, such as an adder or counter, which receives a unique bus address from a previous autochanger (e.g., 62) and calculates a next unique bus address for a next autochanger (e.g., 60).

The electrical connectors 130–144 preferably conduct power to the subcircuits 114–128 as well as the unique bus addresses. By powering the automatic addressing circuit 112 internally, rather than using power from each autochanger module 52–70, the automatic addressing circuit 112 will continue to operate properly even if an autochanger module 52–70 fails. If the automatic addressing circuit 112 is powered by the autochanger modules 52–70, and a module (e.g., 62) fails, the subcircuit 122 in the failed module 62 will not provide a unique bus address to the next module 60, and duplicate bus addresses will result, causing the bus 76 to fail. The electrical connectors 130–144, the power conductor, and the bus 76 may be combined in a single ribbon cable, or may be located in separate cables.

Figure 3:
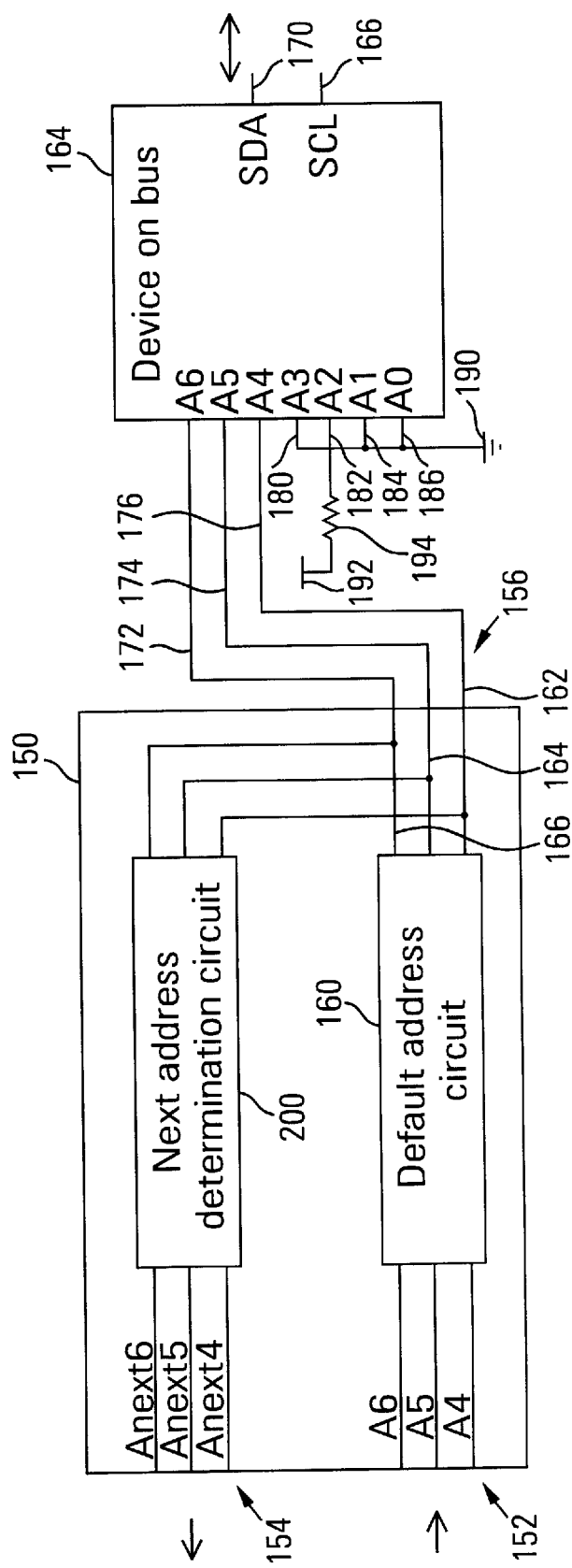
FIG. 3 is a diagram of an autoaddressing circuit and a device on a serial bus.

Referring now to FIG. 3, a preferred subcircuit 150 includes an address determination input 152, an address determination output 154, and an address output 156. These outputs and input 154, 156, and 152 are three bits wide in the preferred embodiment, but may be as wide or as narrow as needed. A unique bus address may be provided to the subcircuit 150 on the address determination input 152 from a subcircuit in a previous autochanger module. If a unique bus address is not provided to the subcircuit 150 by a previous autochanger module, a default address circuit 160 provides a unique bus address for the subcircuit 150. This unique bus address may be set to zero by pulling all three address wires 162, 164, and 166 to ground in a typical digital system, or may be set to seven by pulling all three address wires 162, 164, and 166 up to an active voltage level such as five volts, or may be set to any other number as desired.

The unique bus address is placed on the address output 156 which may be connected to one or more devices 164 within the autochanger module. The device 164 is connected to the I²C clock 166 and data 170 lines, enabling it to receive commands or send status information over the I²C bus. The device 164 also requires that a unique seven bit bus address be provided. The most significant three bits, A6 172, A5 174, and A4 176, are connected to the address output 156 of the subcircuit 150, to provide a unique address for each autochanger module in the stack. The least significant four bits, A3 180, A2 182, A1 184, and A0 186, corresponding to a device address, are permanently configured to a given value by either connecting them to a ground 190 or to a power source 192 through a resistor 194. For example, the device address for a device such as a cartridge read/write device may be permanently set to four (0100 in the binary system) by tying A3 180, A1 184, and A0 186 to ground 190, and tying A2 182 to power 192 through a resistor 194.

The device address for a given device is the same in each autochanger module. For example, the device address for a first cartridge read/write device may be four in every autochanger module throughout the stack, so that the modules are interchangeable. By combining the unique three-bit bus address of each autochanger module with the fixed four-bit device address of each bus-controlled device, any device in the stack may be addressed on the bus even though the autochanger modules are identical, and no individual settings need be changed in the modules.

Continuing now with the description of the subcircuit 150, the unique bus address is placed on the address output 156 and is also passed to a next address determination circuit 200 which calculates the next available unique bus address after the current unique bus address. The next address determination circuit 200 may calculate a next unique bus address in any number of ways, as desired. For example, a simple system may begin the bus addresses at 0 and increment them up to 7, or may begin the bus addresses at 7 and decrement them to 0. The next address determination circuit 200 may also calculate the next available unique bus address in any number of ways, such as by adding one to the current bus address, subtracting one, adding a negative one, or by counting. Once the next available unique bus address is calculated, it is placed on the address determination output 154 where it is transmitted for use by the next autochanger module.

Referring again to FIG. 2, an example of the operation of a preferred automatic addressing circuit 112 in an autochanger stack 50 is as follows. The first subcircuit 128 is connected to the I²C bus at the bottom or beginning of the chain, and nothing is connected to its address determination input 113. The unique bus address for the first autochanger module 70 is thus set to a default value of 7 (111 binary) by the subcircuit 128. The subcircuit 128 also calculates the next available unique bus address of 6 (110 binary) and passes it to the subcircuit 126 in the next autochanger module 66 along the electrical connector 144 which contains three conductors for the autochanger address bits and one or more power conductors. The subcircuit 126 in the autochanger module 66 uses the unique bus address provided it by the first subcircuit 128 in the first autochanger module 70. The subcircuit 126 also calculates the next available unique bus address of 5 and passes it to the subcircuit 124 in the next autochanger module 64, and so on. Thus, the first subcircuit 128 provides a default unique bus address, with the remaining subcircuits 114–126 using a unique bus address provided by the preceding subcircuit 116–128. The subcircuit 114 in the autochanger module 52 at the end of the I²C bus calculates a next unique bus address from the unique bus address provided it by the preceding subcircuit 116, but nothing is connected to the address determination output 111 of the end subcircuit 114.

Figure 4:
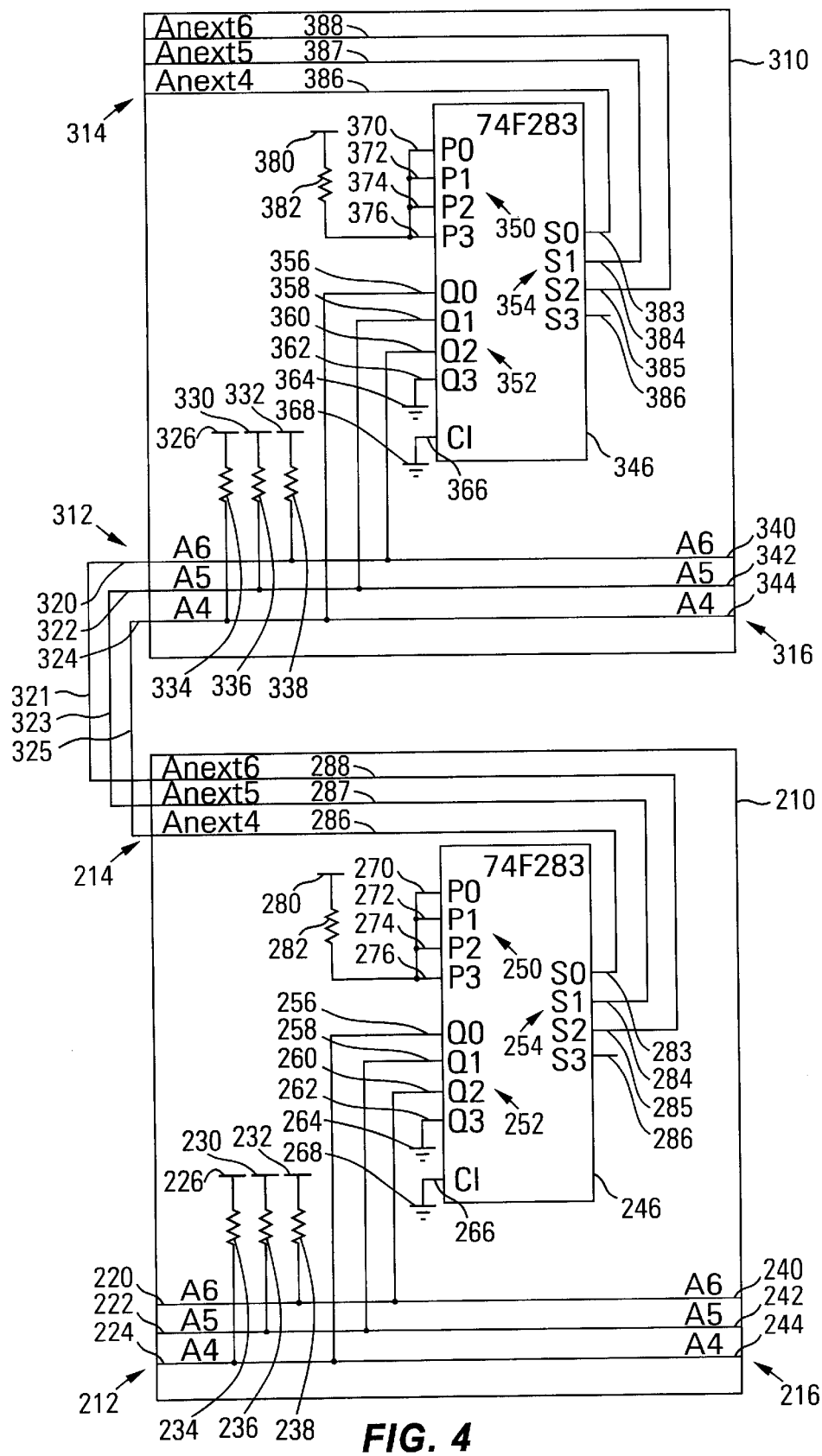
FIG. 4 is a schematic representation of two subcircuits in an autoaddressing circuit.

Referring now to FIG. 4, a detailed description of a portion of an automatic addressing circuit will be given. A subcircuit 210 has an address determination input 212, an address determination output 214, and an address output 216. A second subcircuit 310 is identical to the first subcircuit 210, having an address determination input 312, an address determination output 314, and an address output 316. The subcircuits 210 and 310 each provide a unique three-bit bus address for an autochanger module (or other device). The three bits of the address determination input 212, A6 220, A5 222, and A4 224 are not connected to a previous subcircuit, so no unique bus address is provided to the subcircuit 210. The three bits A6 220, A5 222, and A4 224 are each weakly pulled up to a power source 226, 230, and 232 by resistors 234, 236, and 238, respectively. This causes the unique bus address to default to 111 binary, or seven decimal. The three bits A6 220, A5 222, and A4 224 are also connected to the three bits A6 240, A5 242, and A4 244, respectively, at the address output 216, which may be connected to bus-controlled devices outside the subcircuit 210 as described previously.

An adder integrated circuit (IC) 246 is provided to calculate the next available bus address to be transmitted to the second subcircuit 310. The adder IC 246 comprises a four-bit binary full adder with fast carry, part number FAST 74F283, available from the Philips Semiconductor company of the Netherlands. The adder IC 246 adds a first four-bit input 250 to a second four-bit input 252 to form a four-bit sum at an output 254.

The three bits of the unique bus address, A6 220, A5 222, and A4 224, are connected to the least significant three bits Q0 256, Q1 258, and Q2 260 of the second input 252 of the adder IC 246. The most significant bit Q3 262 of the second input 252 is tied down to ground 264. A carry input 266 of the adder IC 246 is also tied down to ground 268.

The four bits P0 270, P1 272, P2 274, and P3 276 of the first input 250 of the adder IC 246 are tied to power 280 through a resistor 282, to add a binary 111 to the unique bus address at the second input 252. (The most significant bit P3 276 has no affect on the calculation, but is tied to power 280 to prevent it from floating to an indeterminate voltage level, which could cause the adder IC 246 to fail.)

Adding a binary 111 to the unique bus address has the effect of subtracting one. Adder IC's are typically used in electronic circuits to perform subtraction operations by adding a "two's complement" of the number to be subtracted. That is, the number to be subtracted is transformed from ordinary binary format to a two's complement binary format. Adding the two's complement of a binary number is equivalent to subtracting the binary number. The two's complement of one (001) for a three bit binary number is seven (111). Thus, adding a binary 111 is equivalent to subtracting a binary 001.

The adder IC 246 thus subtracts one from the default unique bus address of seven (111) to form the next unique bus address six (110) at the output 254. The three least significant bits S0 283, S1 284, and S2 285 of the output 254 of the adder IC 246 are connected to the address determination output 214 bits Anext4 286, Anext5 287, and Anext6 288, respectively. The most significant bit S3 286 of the output 254 of the adder IC 246 is unused and is left unconnected.

The next unique bus address calculated by the first subcircuit 210 is provided to the second subcircuit 310 by connecting the three bits Anext6 288, Anext5 287, and Anext4 286 at the address determination output 214 to the three bits A6 320, A5 322, and A4 324 at the address determination input 312 of the second subcircuit 310 on wires 321, 323, and 325, respectively.

The three bits A6 320, A5 322, and A4 324 are each weakly pulled up to a power source 326, 330, and 332 by resistors 334, 336, and 338, respectively. However, the unique bus address provided by the first subcircuit 210 appearing at the address determination input 312 overrides the default provided by the pullup resistors 334, 336, and 338. The unique bus address of six (110), as calculated by the adder IC 246 in the first subcircuit 210, is passed through the second subcircuit 310 to the address output 316 on bits A6 340, A5 342, and A4 344.

An adder IC 346 in the second subcircuit 310 is connected and configured the same way as in the first subcircuit 210. The adder IC 346 comprises part number FAST 74F283 with a first four-bit input 350, second four-bit input 352, and a four-bit output 354.

The three bits of the unique bus address, A6 320, A5 322, and A4 324, are connected to the least significant three bits Q0 356, Q1 358, and Q2 360 of the second input 352 of the adder IC 346. The most significant bit Q3 362 of the second input 352 is tied down to ground 364. A carry input 366 of the adder IC 346 is also tied down to ground 368.

The four bits P0 370, P1 372, P2 374, and P3 376 of the first input 350 of the adder IC 346 are tied to power 380 through a resistor 382, to add a binary 111 to the unique bus address at the second input 352, as provided by the previous subcircuit 210. The resulting next unique bus address appearing at the output 354 of the adder IC 346 is five, or 6−1.

The three least significant bits S0 383, S1 384, and S2 385 of the output 354 of the adder IC 346 are connected to the address determination output 314 bits Anext4 386, Anext5 387, and Anext6 388, respectively. The most significant bit S3 386 of the output 354 of the adder IC 346 is unused and is left unconnected. The address determination output 314 may be connected to another subcircuit (not shown), and so on. The exemplary three-bit address scheme described herein automatically provides for a stack of eight modules with addresses 7 down to 0 before the bus addresses will wrap around and repeat. Therefore, if more than eight modules are needed, more than three bits will be required in a binary system to provide unique bus addresses.

The automatic addressing circuit may be modified by one skilled in the art in many minor variations without departing from the inventive concepts disclosed herein. For example, the address output (e.g., 240) could be connected to the output 254 of the adder IC 246, causing the addresses used in the modules to begin with six and cycle down to zero with the top or last module being at address seven. The subcircuits may also be configured to default to address zero and add one rather than defaulting to seven and subtracting one.

The subcircuits may also be configured with counters rather than adders. This embodiment would require an extra wire and would be slower and more complex, thus is not preferred. The output of each counter in each subcircuit is connected to an initialization input of the next counter in the next subcircuit. A single pulse is passed along the chain of counters so that each counter is initialized with the address from the previous subcircuit, and is then incremented by one by counting the single pulse. A delay circuit may be placed in each subcircuit to allow each counter to be initialized with the address from the previous counter before receiving the incrementing pulse.

Figure 5:
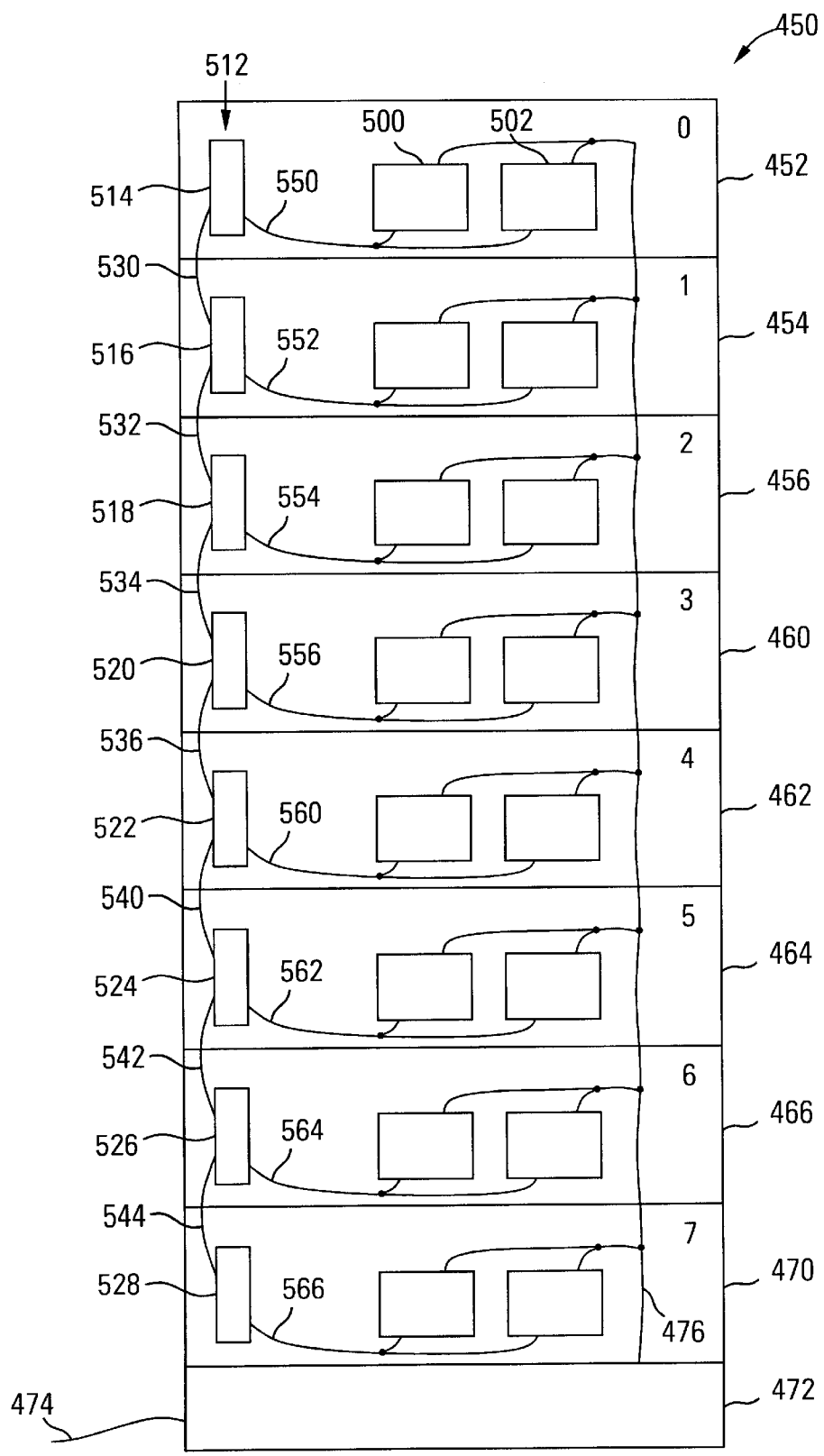
FIG. 5 is an elevation view of a stack of eight autochanger modules with a serial bus accessing individual devices in each autochanger, and an autoaddressing circuit in each autochanger providing a bus address to each device.

Referring now to FIG. 5, an autochanger stack 450 may be configured with a bus 476 which accesses individual devices directly (e.g., 500) without a controller board. The autochanger stack 450 comprises eight autochanger modules 452, 454, 456, 460, 462, 464, 466, and 470, and a stack controller 472. The stack controller 472 is connected to an external computer or network by a cable 474 or other method, and receives data requests and commands for the autochanger stack 450. The stack controller 472 then addresses the command to the appropriate bus-controlled device and sends the command to all bus-controlled devices in the autochanger modules 452–470. The bus 476 preferably comprises an I$^2$C bus, and is connected directly to every bus-controlled device (e.g., 500 and 502) in the autochanger stack 450.

An automatic addressing circuit 512 is connected to each autochanger module 452–470 to automatically provide a unique bus address for each autochanger module 452–470. The automatic addressing circuit 512 may also be connected to the stack controller 472 to obtain power. The automatic addressing circuit 512 includes a subcircuit 514, 516, 518, 520, 522, 524, 526, and 528 in each autochanger module 452–470, respectively. The subcircuits 514–528 are connected in series by a set of electrical connectors 530, 532, 534, 536, 538, 540, 542, and 544. The subcircuits 514–528 include arithmetic circuitry as described with respect to FIG. 2 above to calculate unique bus addresses for subsequent subcircuits.

The output 550, 552, 554, 556, 560, 562, 564, and 566 of each subcircuit 514–528, respectively, is connected to the address input of each bus-controlled device in the same autochanger module 452–470. For example, in the top autochanger module 452, the subcircuit 514 output 550 carrying a unique bus address is connected to each bus-controlled device in the module 452, such as cartridge read/write devices 500 and 502. The unique bus address for the autochanger module 452 which is carried on subcircuit 514 output 550 is preferably a three-bit wide signal with a value of zero in this case. In addition to the three-bit unique bus address for the autochanger module 452, each device 500 and 502 is hardwired with a four-bit device address which is unique within the autochanger module 452 but which is identical to the four-bit device address for the same device in other autochanger modules 454–470. The combined seven bits form the unique seven-bit address required by the I$^2$C bus.

Figure 6:
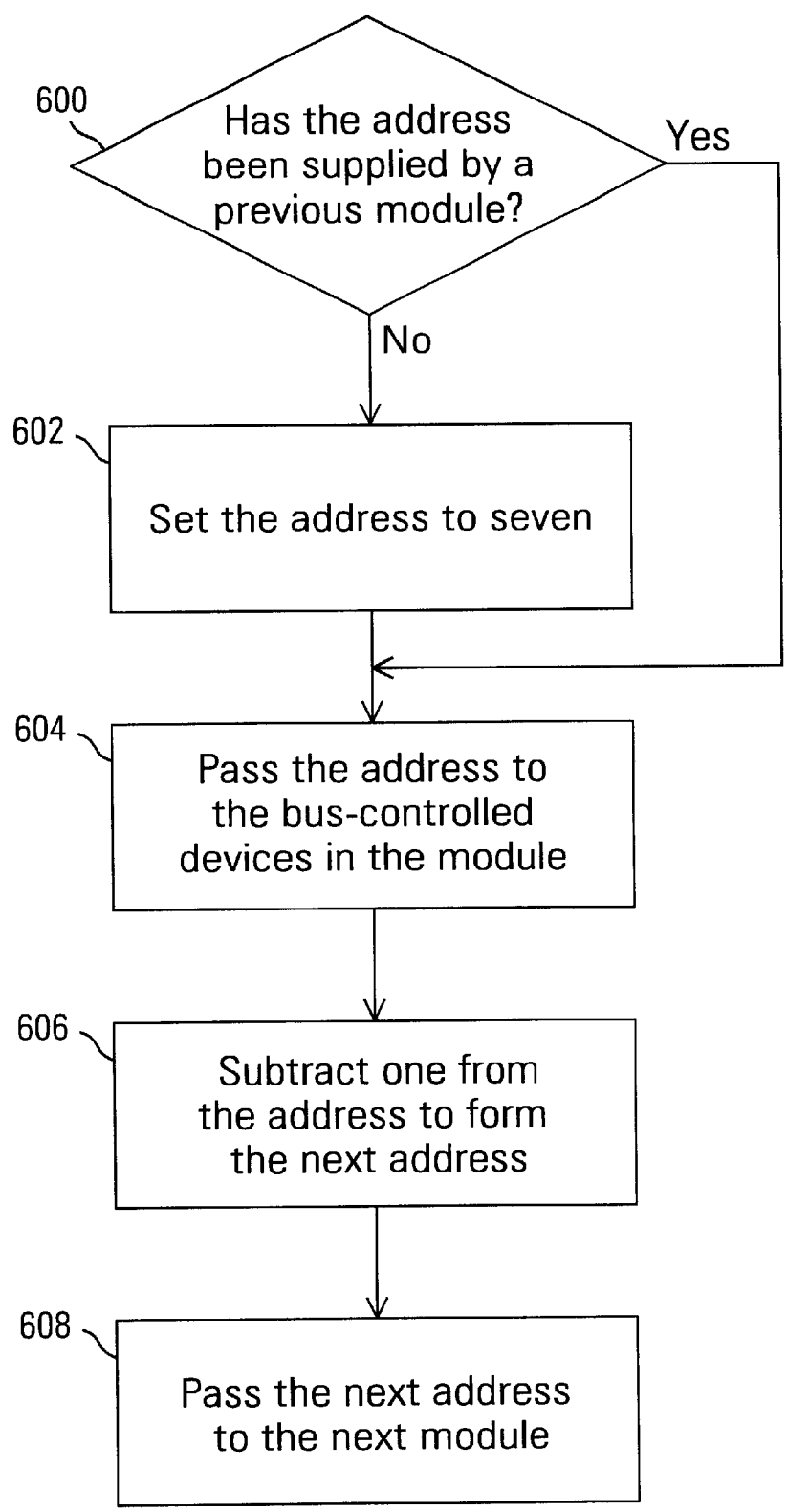
FIG. 6 is a block diagram illustrating a process for automatically providing unique bus addresses to devices on a bus.

Referring now to FIG. 6, an autoaddressing circuit for a stackable autochanger system preferably includes the following steps, not necessarily performed in the following order. The autoaddressing circuit in each autochanger module tests 600 to see if a unique bus address was supplied by a previous autochanger module. If not, the autoaddressing circuit sets 602 the unique bus address to seven. The unique bus address, either supplied by a previous autochanger module or set to a default value, is passed 604 to the bus-controlled devices in the module. The autoaddressing circuit then calculates the next available unique bus address by subtracting one 606 from the unique bus address, and passes 608 the next unique bus address to the next autochanger module.

The system for enabling stacking of autochanger modules, including the bus and autoaddressing circuit, greatly simplifies manufacturing and maintenance of autochanger stacks. Complex and bulky ribbon cables are greatly reduced by the use of a bus. Field technicians are not required to manually configure bus addresses by setting switches or jumpers in autochanger modules since the autoaddressing circuit automates this process. The system also provides the benefit of identifying the physical location of an autochanger module given the unique bus address, since the autoaddressing circuit always orders the modules the same way. Furthermore, a defective or unpowered autochanger module will not prevent the remaining modules or the autoaddressing circuit from operating, since power for the autoaddressing circuit is transmitted inside the circuit rather than relying on the power supply for the autochanger module.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A modular autochanger system, comprising:
   a plurality of autochanger modules being physically connected;
   an electrical bus connected to each of said plurality of autochanger modules for sending commands and receiving status information from said plurality of autochanger modules;
   an automatic addressing circuit connected to each of said plurality of autochanger modules for automatically providing a unique bus address to each of said plurality of autochanger modules; and
   a power supply connected to said automatic addressing circuit, whereby said automatic addressing circuit is powered independently of said plurality of autochanger modules.

2. The modular autochanger system of claim 1, wherein said plurality of autochanger modules are vertically stacked.

3. The modular autochanger system of claim 1, wherein said electrical bus comprises a serial bus.

4. The modular autochanger system of claim 3, wherein said serial bus comprises an Inter IC bus.

5. The modular autochanger system of claim 1, wherein said automatic addressing circuit comprises:
   a plurality of subcircuits, one of said plurality of subcircuits being placed in each of said plurality of autochanger modules; and
   a plurality of electrical connectors being connected between said plurality of subcircuits to electrically connect said plurality of subcircuits.

6. The modular autochanger system of claim 5, wherein each of said plurality of electrical connectors comprise at least three electrical conductors.

7. The modular autochanger system of claim 5, wherein said plurality of electrical connectors also comprise a power conductor to conduct electrical power for said automatic addressing circuit.

8. The modular autochanger system of claim 5, wherein said plurality of subcircuits comprise an address determination input, an address determination output, and an address output.

9. The modular autochanger system of claim 8, wherein said plurality of autochanger modules comprise an end autochanger module being connected to said automatic addressing circuit at an end of said automatic addressing circuit, and a plurality of interior autochanger modules being connected to said automatic addressing circuit before said end, and wherein said address determination output of each of said plurality of interior autochanger modules is connected to said address determination input of a next autochanger module by one of said plurality of electrical connectors.

10. The modular autochanger system of claim 9, wherein said address determination input of a first autochanger module is left unconnected, said first autochanger module being connected to said automatic addressing circuit at a beginning opposite said end.

11. The modular autochanger system of claim 8, wherein each of said plurality of subcircuits comprise an arithmetic circuit, said arithmetic circuit comprising a first input, a second input, and an output, said first input being connected to said address determination input, said second input being connected to at least one voltage supply, and said output being connected to said address determination output to add a unique bus address at said first input to a value at said second input to produce a next unique bus address at said output.

12. The modular autochanger system of claim 11, wherein said arithmetic circuit comprises an adder.

13. The modular autochanger system of claim 11, wherein said arithmetic circuit comprises a counter.

14. The modular autochanger system of claim 11, wherein said value at said second input is negative one.

15. The modular autochanger system of claim 11, wherein said value at said second input is one.

16. The modular autochanger system of claim 8, wherein said address determination input is connected to said address output.

17. The modular autochanger system of claim 8, wherein said address determination input is connected to a power source through at least one resistor so that said unique bus address defaults to a highest address if a previous autochanger module does not provide a unique bus address to said address determination input.

18. The modular autochanger system of claim 8, wherein said address determination input is connected to a ground through at least one resistor so that said unique bus address defaults to a lowest address if a previous autochanger module does not provide a unique bus address to said address determination input.

19. An autochanger stack, comprising:
   a plurality of autochanger modules;
   means for conveying command and status information between said plurality of autochanger modules;
   means for supplying a unique bus address to each of said plurality of autochanger modules in said autochanger stack; and means for supplying electrical power to said means for supplying a unique bus address independent of said plurality of autochanger modules.

20. The autochanger stack of claim 19, wherein said plurality of autochanger modules are physically connected and further comprising means for moving a cartridge picker assembly between said plurality of autochanger modules.

21. A method of automatically creating a unique bus address in an autochanger in an autochanger stack, comprising:

connecting an automatic addressing circuit to said autochanger in said autochanger stack; and providing electrical power to said automatic addressing circuit independent of said plurality of autochangers, said automatic addressing circuit:

determining whether a unique bus address was supplied by a previous autochanger in said autochanger stack, if said unique bus address was not supplied, setting said unique bus address to a default value, passing said unique bus address to at least one device in said autochanger, creating a next unique bus address from said unique bus address, and passing said next unique bus address to a next autochanger in said autochanger stack.

22. The method of claim 21, wherein creating a next unique bus address comprises adding a negative one to said unique bus address.

23. The method of claim 21, wherein said default value is 7.

* * * * *